R. C. FORCE & S. BURNE.
SLIDE GATE.
APPLICATION FILED NOV. 27, 1912.
1,078,271.
Patented Nov. 11, 1913.
2 SHEETS—SHEET 1.
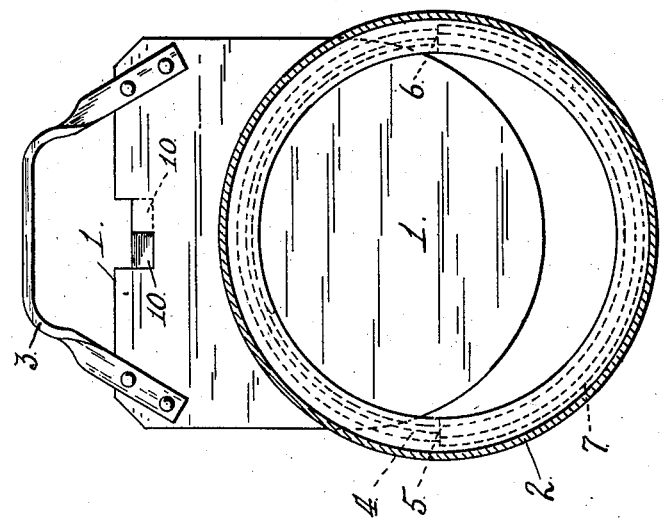
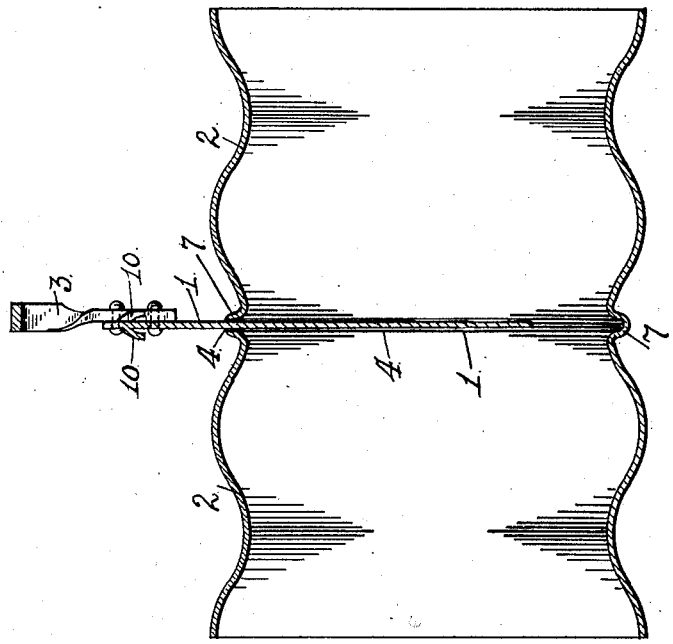
WITNESSES
E. S. Lemme
S. Constine
INVENTOR
Raymond Charles Force
and Stanley Burne
Wm F. Booth
their ATTORNEY

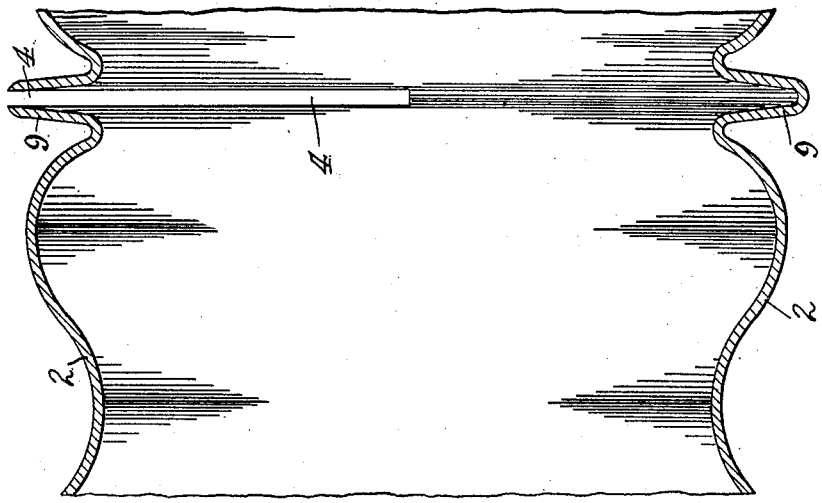
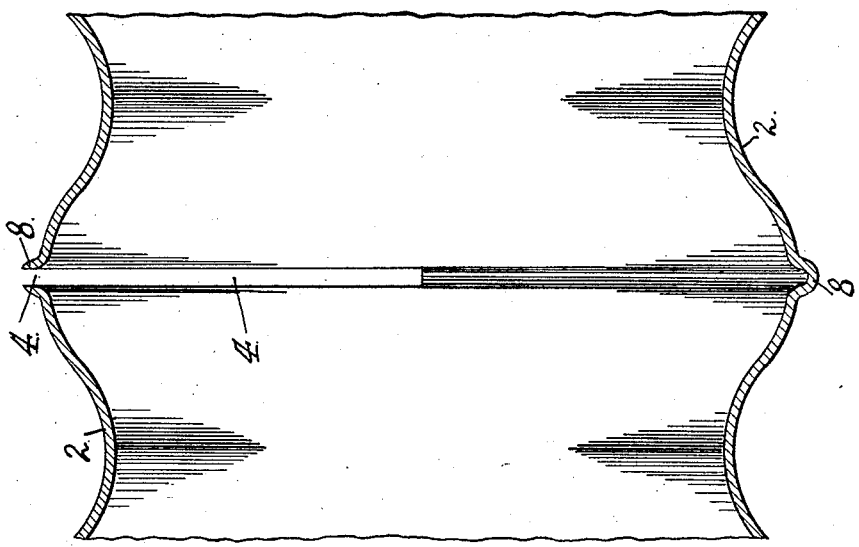

UNITED STATES PATENT OFFICE.

RAYMOND CHARLES FORCE AND STANLEY BURNE, OF LOS ANGELES, CALIFORNIA, ASSIGNORS TO CALIFORNIA CORRUGATED CULVERT COMPANY, OF OAKLAND, CALIFORNIA, A CORPORATION OF CALIFORNIA.

SLIDE-GATE.

1,078,271. Specification of Letters Patent. Patented Nov. 11, 1913.

Application filed November 27, 1912. Serial No. 733,811.

*To all whom it may concern:*

Be it known that we, RAYMOND CHARLES FORCE and STANLEY BURNE, citizens of the United States, residing at Los Angeles, in the county of Los Angeles and State of California, have invented certain new and useful Improvements in Slide-Gates, of which the following is a specification.

Our invention relates to the class of slide-gates, and is adapted for use in connection with any fluid pipe and especially with pipes used in irrigation systems, particularly pipes of the circumferentially corrugated type.

The object of our invention is to provide a simple, effective and economical slide-gate construction for such pipes; and to this end our invention consists in the novel slide-gate which we shall now fully describe by reference to the accompanying drawings in which—

Figure 1 is a longitudinal section of a pipe showing the gate-slide applied thereto, and partly raised. Fig. 2 is a cross section of the pipe showing the gate-slide in elevation, partly raised. Fig. 3 is a longitudinal section of a pipe, showing a modification in the location of the slide-seat, the slide itself being omitted. Fig. 4 is a similar section showing a modification in the shape of the slide-seat.

The slide 1 which forms the gate member may enter and seat itself within the pipe 2, which is here shown as of the circumferentially corrugated type, by any suitable movement relatively to the pipe, as, for example, by being hinged to said pipe and swinging down into place, or, as herein appears, by a straight movement perpendicular to the pipe, and said plate is provided with a lifting device of suitable nature, here indicated as a handle 3. The pipe 2 is provided with a cross-slot 4 with an opening just sufficient to receive the slide 1. This slot extends from the point 5 to the point 6, as indicated by the dotted lines in Fig. 2, or, in other words, the length of the slot is equal to half the circumference of the pipe 2.

In shape the pipe may have any convenient form in cross section, such as square, oval or polygonal, and the slide 1 is shaped to fit the lower half of the pipe; that is, if the pipe is circular, as here shown, the lower part of the slide is made a semi-circle, as shown in Fig. 2. The seat for the slide 1 within the pipe is an encircling groove formed by the inner face of an external circumferential offset formed in the pipe, and the slot 4 is made through this offset. This offset is a specially prepared one and is independent of any of the normal corrugations, valleys or ridges of said pipe, that is, it is not one of said normal corrugations. This offset may be located at various points or cross-sections of the pipe, and may be of various sizes and shapes. To illustrate these features, we show the offset 7 in Figs. 1 and 2, as being made in one of the cross-sectional areas of the pipe of lesser diameter, so that the slide-seat groove of said offset lies in one of the interior ridges of the pipe. In Fig. 3 we show the offset 8, made in one of the cross-sectional areas of the pipe of greater diameter, so that the slide-seat groove of said offset lies in one of the interior valleys of the pipe.

In Figs. 1, 2 and 3, the offsets 7 and 8 are relatively small and shallow, while in Fig. 4 we show an offset 9 which is relatively large and deep. In all cases the slide 1 seats itself snugly within the groove of the offset and forms a joint which is tight enough for general purposes. There is however a special advantage in that location of the offset which is shown in Figs. 1 and 2, and this construction is preferred. In this case, the seat for the slide 1 lies in an interior ridge of the pipe. In places where the water contains more or less sand or gravel, it is evident that the interior valleys of the pipe tend to fill up and to cover the slide-seat when said seat is formed in an interior valley, and thus prevent the proper seating of the slide, but when said seat is formed in an interior ridge, said ridge is at all times exposed to the full force of the current of water and will thus be kept clean so that the slide will seat properly.

In order to better insure the close contact of the surfaces of the cross-slot 4 with slide 1 when the latter is closed, and thereby to form a better joint, the slide is provided with flanges 10. These flanges may be independent pieces secured to the slide or they may, as here shown, be integral with the slide which is slit and bent to form them. They are applicable as well to a hinged swinging slide as to the slide here shown. Their function is to grip by a wedging action the upturned edges of the offset in which the slot 4 is formed when the slide is closed, and press said edges against the slide. It is best to make one of these flanges project from one side of the slide and another from the other side of the slide, so that it is immaterial in which direction the flow through the pipe may be; as there will then be a grip flange on the side upon which the flow pressure is imposed, which flange will thus act to close the slot on that side.

We claim:—

1. In a slide-gate for pipes, the combination of a circumferentially corrugated pipe having in the plane of one of its internal ridges a circumferential groove exposed to the interior of the pipe, said pipe being formed with a cross slot in an arc of the circumference of said groove; and a slide adapted to fit and move in said slot to traverse the cross sectional area of the pipe's interior and to seat itself in the circumferential groove.

2. In a slide-gate for pipes, the combination of a circumferentially corrugated pipe having a circumferential exterior offset independent of the normal corrugations of said pipe and formed with a groove on its inner face exposed to the interior of the pipe, said offset being made in the cross section of the pipe of lesser diameter whereby its grooved inner face lies in the plane of an interior ridge of one of the normal corrugations of the pipe, and said pipe having a cross slot made through its offset in an arc of its circumference, and a slide adapted to fit and move in said slot to traverse the cross-sectional area of the pipe's interior and to seat itself in the interior groove of the offset.

3. In a slide-gate for pipes, the combination of a pipe having a circumferential exterior offset formed with a groove on its inner face exposed to the interior of the pipe, said pipe having a cross slot made through its offset in an arc of its circumference, and a slide adapted to fit and move in said slot to traverse the cross-sectional area of the pipe's interior and to seat itself in the interior groove of the offset, said slide having a flange projecting from its side adapted to grip the upturned edge of the offset to press the slot wall against the slide when the latter is closed.

4. In a slide-gage for pipes, the combination of a pipe having a circumferential exterior offset formed with a groove on its inner face exposed to the interior of the pipe, said pipe having a cross slot made through its offset in an arc of its circumference, and a slide adapted to fit and move in said slot to traverse the cross-sectional area of the pipe's interior and to seat itself in the interior groove of the offset, said slide having a pair of flanges projecting one from one side and the other from the other side adapted to grip the upturned edges of the offset to press the slot walls against the slide when the latter is closed.

In testimony whereof we have signed our names to this specification in the presence of two subscribing witnesses.

RAYMOND CHARLES FORCE.
STANLEY BURNE.

Witnesses:
EDWARD C. CAMPBELL,
BERNARD G. MARSHALL.

---

Copies of this patent may be obtained for five cents each, by addressing the "Commissioner of Patents, Washington, D. C."